May 2, 1950 J. R. C. QUILTER 2,505,869
PARACHUTE CONTROL APPARATUS
Filed Jan. 10, 1946 2 Sheets-Sheet 1
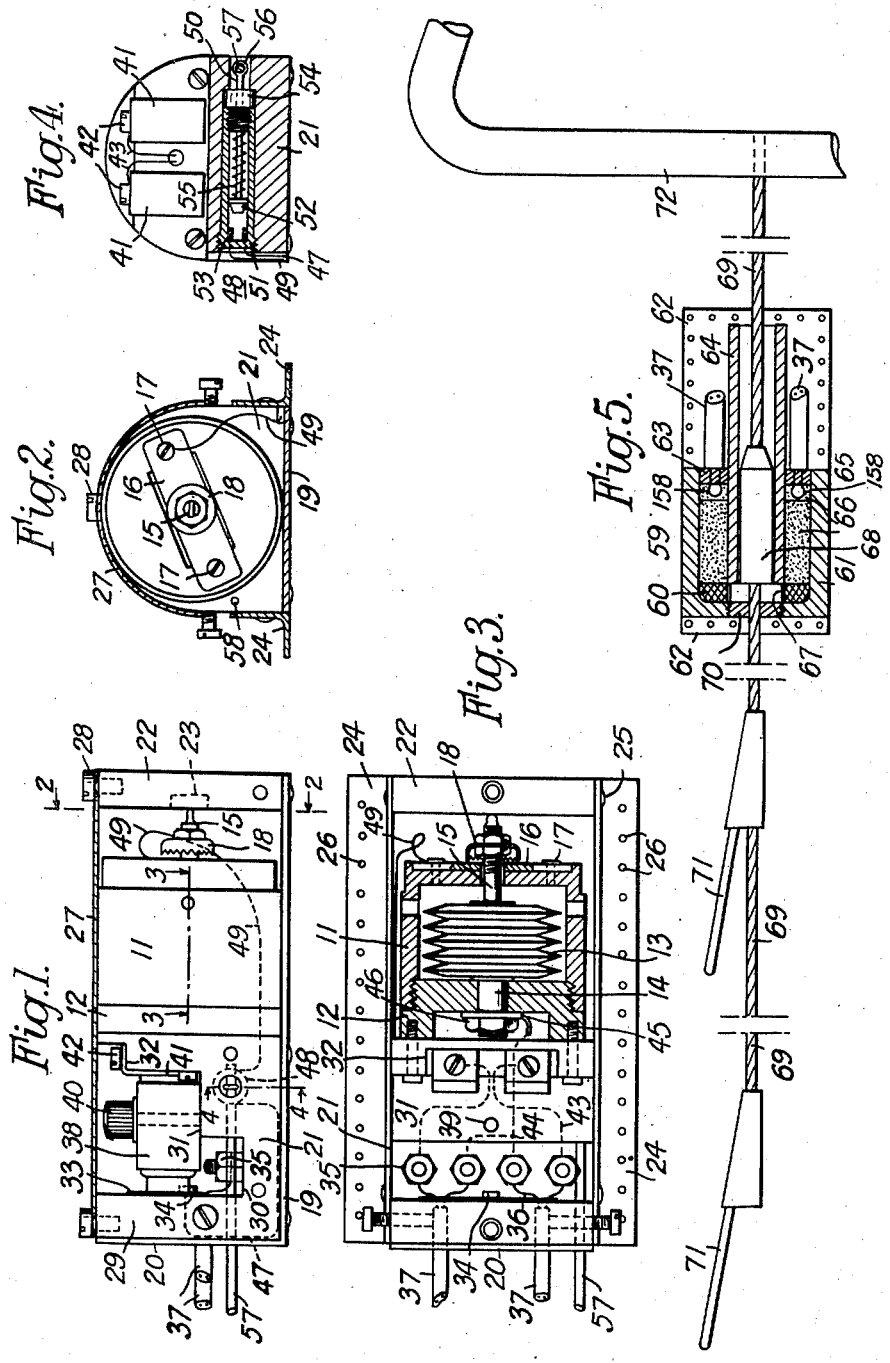
Inventor
John Raymond Cuthbert Quilter
by John H Graham
HIS AGENT.

May 2, 1950 — J. R. C. QUILTER — 2,505,869
PARACHUTE CONTROL APPARATUS
Filed Jan. 10, 1946 — 2 Sheets-Sheet 2

Inventor
John Raymond Cuthbert Quilter
by John H. Graham
HIS AGENT.

Patented May 2, 1950

2,505,869

UNITED STATES PATENT OFFICE 2,505,869

PARACHUTE CONTROL APPARATUS

John Raymond Cuthbert Quilter,
Woking, England

Application January 10, 1946, Serial No. 640,221
In Great Britain February 15, 1945

4 Claims. (Cl. 244—150)

This invention relates to parachute apparatus and more particularly to automatic apparatus for controlling the deployment of parachutes for occupants of aircraft flying at great height where the lack of oxygen is liable to render them unconscious upon leaving or being ejected from the aircraft. In such conditions, it is desirable to allow the pilot or other occupant to fall freely until he reaches a level at which the atmosphere is more favourable to his recovery and to release the parachute only at this predetermined height; for example, in the case of a jet-propelled aircraft flying at 50,000 feet, if the pilot were to leave or be ejected from the aircraft, the automatic control would be started or set ready for operation, but would delay bringing the parachute into action until the pilot had fallen freely to the denser atmosphere at a height of say 10,000 feet.

The invention has for its main object to provide improved apparatus of this character, suitable for releasing the parachute by withdrawing the customary ripcord pin of the pack worn by a pilot or other occupant.

Another object of the invention is to provide a servomotor for effecting the release, the operation of the servomotor being controlled by a barometric device of small size which can be readily accommodated upon the harness or upon the parachute pack.

A further object is to provide improved apparatus of this character, wherein the normal manual release is adapted to override the automatic control if so desired, in order that the same parachute equipment may be available for use at lower altitudes when the manual release can be employed without regard to the automatic control.

Other objects and advantages of the invention will hereinafter appear from the following description of two suitable embodiments, given with reference to the accompanying drawings, in which:

Fig. 1 is a side elevation of the barometric device in one form of construction adapted for electrical operation.

Fig. 2 is an end view in section on the line 2—2 of Fig. 1.

Fig. 3 is a plan, partly in section on the line 3—3 of Fig. 1, with the battery removed.

Fig. 4 is a detail in section on the line 4—4 of Fig. 1.

Fig. 5 is a sectional view of a pyrotechnic servomotor for the withdrawal of the rip-cord pin from the pack.

Figure 6:
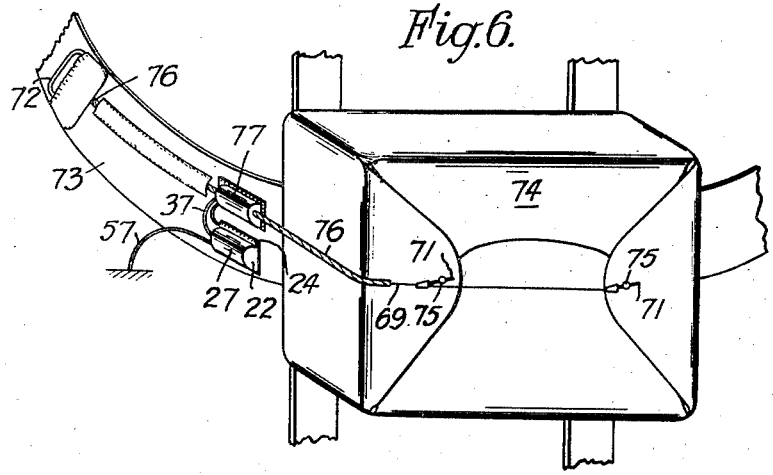
Fig. 6 shows the location of the barometric device and servomotor upon the parachute harness, together with the rip-cord handle for manual operation of the release.

Referring to Figs. 1 to 4, the barometric device comprises a bell-shaped casing 11 closed by an end cover 12 and enclosing a series of aneroid capsules 13 fixed at one end upon a post 14 which extends through the cover 12; the movable end of the capsules 13 carries a screw-threaded rod 15 passing freely through a hole in the casing and through a metal bar 16 secured diametrically across the exterior of the casing by means of screws 17. The rod 15 is fitted with an adjustable collar 18 having a serrated edge adapted to make contact with the bar 16, but the expansion of the capsules due to the reduction of atmospheric pressure above a predetermined height moves the collar 18 clear of the bar 16, contact being re-established upon return of the predetermined height, as during the descent of a pilot escaping from an aircraft.

The casing 11 of the barometric device is shown secured upon a metal base plate 19, one end of which is bent up at right angles to form a wall 20, between which and the casing 11 there is fitted a block 21 of insulating material such as ebonite. Another block 22, also of insulating material, is secured to the other end of the base plate, this block being recessed at 23 to allow freedom of movement of the rod 15. Two side rails 24, of angle section, are fixed to blocks 21 and 22 by screws 25, the outward flanges of these side rails being perforated at 26 to enable the device to be fixed upon any convenient part of the harness or pack, for example by stitching. The upper edges of the blocks 21 and 22 are rounded to semi-circular form, as seen in Fig. 2; a curved shield 27 being fitted over them and secured in place by screws 28; the bottom edges of the shield 27 are substantially flush with the upper edges of the side rails 24.

The block 21 is of stepped formation, providing a wall portion 29, beside the wall 20 of the base plate, a recess 30, a lower shelf 31 and an upper shelf 32. Against the inner face of the wall portion 29, there is fitted a contact plate 33, secured by a screw 34 extending through the wall 20 of the base plate. At the bottom of the recess 30 there are provided four terminals 35, to which are connected the two pairs of leads 36 from two-twin-wire detonator cables 37 passing through holes in the wall 20. Upon the lower shelf 31, there is detachably mounted a two-cell electric battery 38, secured by means of a central stud 39 fixed in the shelf, with a nut 40 and washer upon the upper end of the stud; both poles of the two cells at one end of the battery engage with the contact plate 33. Upon the upper shelf 32, there are mounted two separate overhanging contact strips 41 which engage with the other poles of the two cells; these strips are secured by screws 42, from which leads 43 extend to the two outer terminals 35.

The two inner terminals 35 are connected together by a common lead 44 extending along a groove in the underside of the stepped block 21 and upwards between the block and the aneroid cover to connect with a tag 45 secured by the nut 46 upon the post 14; the latter connects electrically through the capsule assembly with the rod 15 and collar 18 at the other end.

The single contact plate 33 is connected by its screw 34, and by a lead 47 extending along grooves in the block 21, to one pole of a plunger switch 48 enclosed in the lower part of the block, the other pole of this switch being connected by a lead 49 to one of the screws 17 of the bar 16; as shown in Fig. 4, the switch 48 comprises a plunger rod 50 slidable in a guide tube 51 of insulating material, which is screwed into a transverse hole in the block, the rod carrying a contact disc or cone 52 adapted to bridge two insulated contact segments 53 near the head of the tube 51. A plug 54 screwed into the other end of the tube provides an abutment for a spring 55 coiled around the rod 50, the latter projecting through the plug 54 and having its outer end formed into an eye 56; this eye can be engaged by a locking pin 57 guided in holes 58 in the block, such engagement retaining the plunger switch in open position. The locking pin 57 will be withdrawn by the pull of a static line attached to some convenient part of the aircraft, for example to the pilot's seat, so that until he leaves his seat, the plunger switch will remain open and the electrical circuit controlled by the barometric device cannot be closed.

When, however, the locking pin 57 has been withdrawn and the switch 48 has therefore closed by operation of the spring 55, the circuit will be prepared for completion as soon as the capsules 13 are collapsed to the required extent by the increasing atmospheric pressure as the pilot descends; at the predetermined altitude, for example at 10,000 feet, the capsules will bring the collar 18 into contact with the bar 16, thereby completing the circuit of the detonator cables 37.

These cables extend to a pyrotechnic servomotor illustrated in Fig. 5, where they are connected to two firing bridges 158 for igniting the gun-powder charges or initiators of an explosive cartridge 59, adapted to operate the rip-cord release of the parachute pack. The cartridge comprises a suitable propellant charge 60 enclosed in the base of a shell 61 provided with flanges 62 perforated for stitching to any convenient part of the harness or pack; the firing bridges 158 are secured in an annular lid 63 closing the end of the shell and supporting a coaxial tube or cylinder 64. Around this cylinder, between the propellant charge 60 and the gunpowder charge 65 in which the firing bridges are embedded, there is packed a delay composition 66, giving a period of two seconds for example between the firing of the gunpowder and the explosion of the propellant charge, which is sealed internally by a ring of wax 67. The gases produced by the explosion enter the cylinder 64 and act therein upon a piston 68 secured to the rip-cord 69 which passes axially through the piston and through an aperture in a plug 70 at the closed end of the shell; the movement of the piston pulls upon the rip-cord pins 71, withdrawing them from the locking studs or the like upon the pack, so that the parachute is released. The other end of the rip-cord extends from the piston 68, outwardly of the cylinder 64, and is attached to a handle 72 by which the rip-cord pins can be operated manually at any time.

As shown in Fig. 6, the barometric device is mounted by means of its perforated side rails 24 upon one side of the harness belt 73, at a suitable distance from the parachute pack 74, and the pyrotechnic servomotor is similarly mounted by means of its perforated flanges 62; the rip-cord pins 71 are engaged in the locking studs 75 which maintain the pack in closed condition. The rip-cord extends laterally from the pack by way of a guide casing 76, through the servomotor 77, and by way of a second length of guide casing 76, its other end being attached to the handle 72 supported upon the belt 73 or other convenient part of the harness; thus the normal manual release can override the automatic control if the pilot so desires. The same parachute equipment will therefore be available for use at lower heights than the predetermined altitude at which the automatic control is adjusted to operate, and the manual release handle can be employed at any time without regard to the automatic control.

Figure 7:
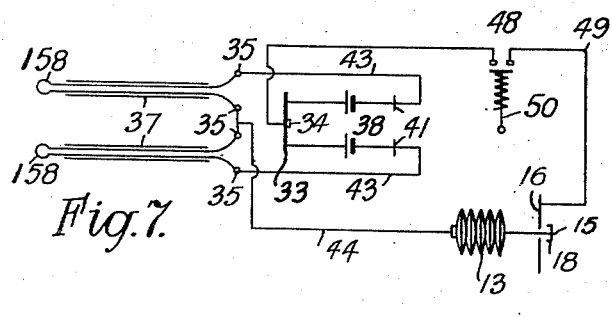
Fig. 7 is a diagram of the electrical connections.

Fig. 7 shows the electrical connections of the barometric device and pyrotechnic servomotor. The circuit may be traced from the positive poles of the battery 38, in contact with the plate 33, by way of screw 34, lead 47, to the plunger switch 48, and from the latter by way of lead 49 to the bar 16; the collar 18, adapted to contact with the bar, is connected by the screwed rod 15, capsules 13, post 14, lead 44, and the two central terminals 35 to one conductor of each detonator cable 37, through the firing bridges 158, back through the other conductor of the cables 37 to the outer terminals 35, and from the latter by leads 43 to the strips 41 in contact with the negative poles of the respective cells of battery 38.

Any suitable form of barometric device adapted for operation by atmospheric pressure may be employed to withdraw the rip-cord pin automatically by the aid of the servomotor.

Figure 8:
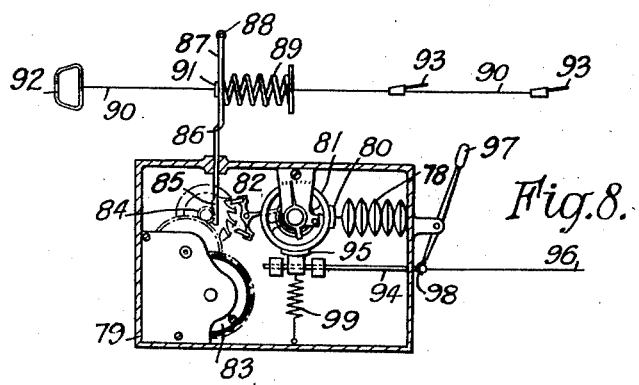
Fig. 8 illustrates an alternative form of servomotor comprising a clockwork adapted to trip a spring for the release of the pack, the barometric device being enclosed in the same casing as the clockwork.

Other forms of servomotor may be employed instead of the pyrotechnic device described above; for example, Fig. 8 represents a clockwork mechanism, adapted to release a spring in order to open the pack. In this example, the barometric device comprises a series of aneroid capsules 78, fixed at one end to the wall of the casing 79, the other end of the capsule series carrying a friction pad 80 in breaking contact with the balance wheel 81 of the clockwork 82 which is driven by a spring barrel 83; one of the clockwork spindles carries a pinion 84 meshing with a toothed rack 85 of which one extremity forms a latch 86 slidable in and out of the casing 79. When projecting, this latch engages an arm 87, pivoted at 88, against which a powerful coiled spring 89 presses; movement of the arm by the spring is normally prevented by the latch. The rip-cord 90 extends axially through the spring 89 and passes through a hole in the arm, adjacent to which it is fitted with a collar 91; this end of the rip-cord is connected to a handle 92 for manual operation, the pull being unaffected by the latching of the arm 87. The other end of the rip-cord extends to the pack, where it carries the pins 93 normally locking the closure flaps, as already described.

Operation of the barometric device may be prevented, during the normal climb of the aircraft until the predetermined altitude has been reached, by a locking pin 94 which maintains a second friction pad 95 in contact with the balance wheel; this locking pin will be withdrawn by a static line 96 or other attachment to the aircraft, when the pilot makes his escape, or alternatively the pin 94 can be withdrawn manually by means of a lever or handle 97 having a forked end 98 which engages the pin 94, without obstructing the direct pull of the static line 96. The pad 95 will then be lifted from the wheel 81 by a spring 99 and the other pad 80 will also be lifted by the collapse of the aneroid capsules at the predetermined height, after which the latch 86 is freed at the end of a short period of say two seconds by the operation of the clockwork, so that the pack will be opened automatically by the stressed spring 89. The handle 92 provides an overriding action which can effect the release at any time desired by the pilot.

What I claim is:

1. Parachute control apparatus, comprising a parachute pack, means for retaining said pack in closed condition, a rip cord having a handle for withdrawing said retaining means to cause release of the parachute, a piston secured to said rip cord, a cylinder for said piston, a propellant charge adapted to produce explosion gases for driving said piston along said cylinder in a direction to cause withdrawal of said retaining means by said rip cord, a barometric device responsive to altitude, means for igniting said propellant charge by the response of said barometric device at descent to a predetermined altitude, means normally rendering said barometric device inoperative to ignite said propellant charge, and automatic means for rendering said barometric device operative upon descent from an aircraft, said rip cord being manually operable by means of its handle for withdrawing said retaining means independently of said piston.

2. Parachute control apparatus, comprising a parachute pack, means for retaining said pack in closed condition, a rip cord for withdrawing said retaining means to cause release of the parachute, a piston secured to said rip cord, a cylinder for said piston, a propellant charge adapted to produce explosion gases for driving said piston along said cylinder in a direction to cause withdrawal of said retaining means by said rip cord, a barometric device responsive to altitude, means for igniting said propellant charge by the response of said barometric device at descent to a predetermined altitude, means normally rendering said barometric device inoperative to ignite said propellant charge, means for rendering said barometric device operative upon descent from an aircraft, and manual means for operating said rip cord to cause withdrawal of said retaining means, said manual means being adapted to override the control exerted by said barometric device.

3. Parachute control apparatus, comprising a parachute pack, means for retaining said pack in closed condition, a rip cord having a handle for withdrawing said retaining means to cause release of the parachute, a collar fixed upon said rip cord, a pivoted arm mounted adjacent to said collar, a spring pressing said arm against said collar in a direction to withdraw said retaining means, a latch normally engaging said arm to hold it fast against the pressure exerted by said spring, a timing mechanism adapted to release said latch, two separate means normally preventing the start of said timing mechanism, automatic means for freeing one of said separate preventing means at initial descent from an aircraft, and a barometric device responsive to altitude for freeing the other of said separate preventing means at descent to a predetermined altitude, said rip cord being manually operable by means of its handle for withdrawing said retaining means independently of the release of said latch.

4. Parachute control apparatus, comprising a parachute pack, means for retaining said pack in closed condition, a harness belt carrying said pack, a rip cord for withdrawing said retaining means to cause release of said parachute, a handle for operating said rip cord, said handle mounted on said belt, a servomotor mounted on said belt and adapted to operate said rip cord, a barometric device responsive to altitude and adapted to cause operation of said servomotor at descent to a predetermined altitude, said barometric device mounted on said belt, means normally rendering said barometric device inoperative to operate said servomotor, and a static line attachable to an aircraft for rendering said barometric device operative upon descent from said aircraft, the operation of said rip cord by said handle overriding the control exerted by said barometric device when inoperative.

JOHN RAYMOND CUTHBERT QUILTER.

REFERENCES CITED

The following references are of record in the file of this patent:

UNITED STATES PATENTS

| Number | Name | Date |
|---|---|---|
| 1,535,475 | Jeansen et al. | Apr. 28, 1925 |
| 1,800,575 | Tofflemire | Apr. 14, 1931 |
| 1,944,795 | Lafayette | Jan. 23, 1934 |
| 2,110,552 | Hayden | Mar. 8, 1938 |
| 2,365,445 | Badowski | Dec. 19, 1944 |

FOREIGN PATENTS

| Number | Country | Date |
|---|---|---|
| 278,695 | Great Britain | Apr. 5, 1928 |